US008964610B2

(12) United States Patent
Chao (10) Patent No.: US 8,964,610 B2
(45) Date of Patent: Feb. 24, 2015

(54) SYSTEM AND METHOD OF REDUCING FACTORY PROGRAM TIME FOR WIRELESS DEVICES

(75) Inventor: Jesus Chao, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1235 days.

(21) Appl. No.: 12/141,767

(22) Filed: Jun. 18, 2008

(65) Prior Publication Data

US 2009/0318134 A1    Dec. 24, 2009

(51) Int. Cl.
*G08C 17/00* (2006.01)
*G06F 9/00* (2006.01)
*G06F 9/24* (2006.01)
*G06F 15/177* (2006.01)
*G06F 9/44* (2006.01)

(52) U.S. Cl.
CPC ............. *G06F 9/441* (2013.01); *G06F 9/4408* (2013.01)
USPC .................................... 370/311; 713/1; 713/2

(58) Field of Classification Search
USPC .............................. 370/311; 714/11; 713/1, 2
See application file for complete search history.

(56) References Cited

U.S. PATENT DOCUMENTS

| 6,593,850 | B1 * | 7/2003 | Addy ............................ 340/501 |
| 7,058,797 | B2 | 6/2006 | Miyamoto et al. |
| 7,159,106 | B2 | 1/2007 | Meaney et al. |
| 7,284,120 | B2 | 10/2007 | Blouin et al. |
| 2004/0221194 | A1 * | 11/2004 | Denninghoff et al. .......... 714/11 |
| 2005/0278147 | A1 * | 12/2005 | Morton et al. ................ 702/183 |
| 2006/0095753 | A1 | 5/2006 | Hori |
| 2009/0292911 | A1 * | 11/2009 | Chien ............................... 713/2 |

FOREIGN PATENT DOCUMENTS

| CN | 1704763 A | 12/2005 |
| EP | 1703383 A1 | 9/2006 |
| EP | 1832977 A2 | 9/2007 |
| JP | 2005222366 A | 8/2005 |
| JP | 2006127267 A | 5/2006 |
| WO | 2007101533 A2 | 9/2007 |

OTHER PUBLICATIONS

International Search Report and the Written Opinion—PCT/US2009/047010, International Search Authority—European Patent Office—Oct. 1, 2009.

* cited by examiner

*Primary Examiner* — Derrick Ferris
*Assistant Examiner* — Farhad Ali
(74) *Attorney, Agent, or Firm* — Satheesh K. Karra (57) ABSTRACT

A system and method of booting a wireless device is disclosed and may include reading a factory test mode memory item when the wireless device is powered on, determining whether the factory test mode memory item is set to yes, and preventing an operating system of the wireless device from booting when the factory test mode memory item is set to yes. The system and method may further include remaining in a boot loader mode, enumerating a port as a diagnostic serial port, and receiving one or more diagnostic packets. Moreover, the system and method may include allowing the operating system of the wireless device to boot when the factory test mode memory item is set to no.

16 Claims, 6 Drawing Sheets

SYSTEM AND METHOD OF REDUCING FACTORY PROGRAM TIME FOR WIRELESS DEVICES

FIELD

The present disclosure generally relates to the wireless devices, and more particularly, to systems and methods of reducing factory program time for wireless devices.

DESCRIPTION OF THE RELATED ART

When manufacturing wireless devices, such as cellular telephones, the manufacturer may perform numerous tests on the wireless devices. These tests may include calibrating the wireless devices, configuring the wireless devices, loading software, or a combination thereof. Typically, after each test, the wireless device may need to be rebooted. Further, the manufacturer may program a large batch of wireless devices and store the programmed wireless devices until delivery. Over the course of time, it may become necessary to reprogram these stored wireless devices with newer software or carrier specific software. When reprogramming the stored wireless devices, it may be necessary to reboot the stored wireless devices many times. With a large number of wireless devices, the reboot time may be lengthy.

SUMMARY OF THE DISCLOSURE

A method of booting a wireless device is disclosed and may include reading a factory test mode memory item when the wireless device is powered on, determining whether the factory test mode memory item is set to a first state, and preventing an operating system of the wireless device from booting when the factory test mode memory item is set to the first state.

In this aspect, the method may further include remaining in a boot loader mode, enumerating a port as a diagnostic serial port, and receiving one or more diagnostic packets. Moreover, the method may include allowing the operating system of the wireless device to boot when the factory test mode memory item is set to a second state. In this aspect, the method may also include determining whether a boot count is greater than or equal to a threshold when the factory test mode memory item is set to a second state and allowing the operating system of the wireless device to boot when the boot count is greater than or equal to the threshold. Further, the method may include altering the boot count when the boot count is not greater than or equal to the threshold and setting the factory test mode memory item to the first state.

In another aspect, a wireless device is disclosed and may include a memory and a processor connected to the memory. The processor may be operable to read a factory test mode memory item when a wireless device is powered on, to determine whether the factory test mode memory item is set to a first state, and to prevent an operating system of the wireless device from booting when the factory test mode memory item is set to the first state.

In this aspect, the processor may be operable to remain in a boot loader mode, to enumerate a port as a diagnostic serial port, and to receive one or more diagnostic packets. Additionally, the processor may be operable to allow the operating system of the wireless device to boot when the factory test mode memory item is set to a second state. The processor may also be operable to determine whether a boot count is greater than or equal to a threshold when the factory test mode memory item is set to a second state and to allow the operating system of the wireless device to boot when the boot count is greater than or equal to the threshold. In this aspect, the processor may also be operable to alter the boot count when the boot count is not greater than or equal to the threshold and to set the factory test mode memory item to the first state.

In yet another aspect, a wireless device is disclosed and may include means for reading a factory test mode memory item when a wireless device is powered on, means for determining whether the factory test mode memory item is set to a first state, and means for preventing an operating system of the wireless device from booting when the factory test mode memory item is set to the first state. Further, the wireless device may include means for remaining in a boot loader mode, means for enumerating a port as a diagnostic serial port, and means for receiving one or more diagnostic packets.

In this aspect, the wireless device may also include means for allowing the operating system of the wireless device to boot when the factory test mode memory item is set to a second state. Additionally, the wireless device may include means for determining whether a boot count is greater than or equal to a threshold when the factory test mode memory item is set to a second state and means for allowing the operating system of the wireless device to boot when the boot count is greater than or equal to the threshold. The wireless device may further include means for altering the boot count when the boot count is not greater than or equal to the threshold and means for setting the factory test mode memory item to the first state.

In still another aspect, a computer program product is disclosed and may include a computer-readable medium. The computer-readable medium may include at least one instruction for reading a factory test mode memory item when the wireless device is powered on, at least one instruction for determining whether the factory test mode memory item is set to a first state, and at least one instruction for preventing an operating system of the wireless device from booting when the factory test mode memory item is set to the first state.

The computer-readable medium may also include at least one instruction for remaining in a boot loader mode, at least one instruction for enumerating a port as a diagnostic serial port, and at least one instruction for receiving one or more diagnostic packets. Further, the computer-readable medium may include at least one instruction for allowing the operating system of the wireless device to boot when the factory test mode memory item is set to a second state.

The computer-readable medium may also include at least one instruction for determining whether a boot count is greater than or equal to a threshold when the factory test mode memory item is set to a second state and at least one instruction for allowing the operating system of the wireless device to boot when the boot count is greater than or equal to the threshold. Moreover, the computer-readable medium may include at least one instruction for altering the boot count when the boot count is not greater than or equal to the threshold and at least one instruction for setting the factory test mode memory item to the first state.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, an "content" referred to herein, may also include files that are not executable in nature, such as documents that may need to be opened or other data files that need to be accessed.

In this description, the terms "communication wireless device," "wireless device," "wireless telephone," "wireless communications wireless device," and "wireless handset" are used interchangeably. With the advent of third generation ("3G") wireless technology, more bandwidth availability has enabled more electronic wireless devices with wireless capabilities. Therefore, a wireless device could be a cellular telephone, a pager, a PDA, a smartphone, a navigation wireless device, or a computer with a wireless connection.

Figure 1:
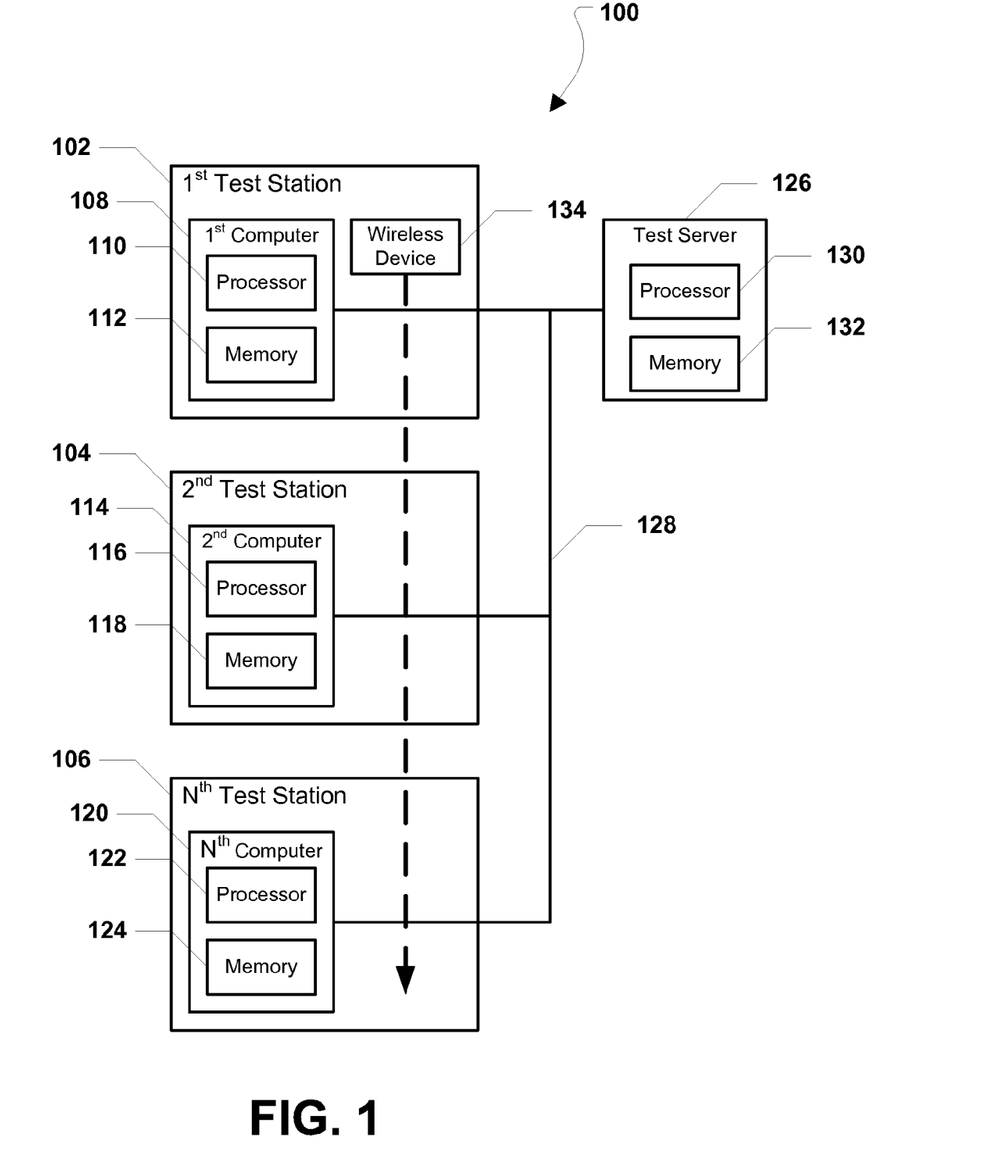
FIG. 1 is a diagram of a system for testing wireless devices.

Referring initially to FIG. 1, a wireless device test system is shown and is generally designated 100. As shown, the system 100 may include a first test station 102, a second test station 104, and an Nth test station 106. The first test station 102 may include a first computer 108 that may include a processor 110 and a memory 112. The second test station 104 may also include a second computer 114 and the computer 114 may include a processor 116 and a memory 118. Moreover, the Nth test station 106 may include an Nth computer 120. As depicted, the Nth computer 120 may include a processor 122 and a memory 124.

As illustrated in FIG. 1, the system 100 may also include a test server 126 connected to the computers 108, 114, 120 via a network interface 128. The test server 126 may include a processor 130 and a memory 132 coupled thereto.

FIG. 1 further indicates that the system 100 may include at least one wireless device 134 within the first test station 102. The wireless device 134 may be installed within the first test station 102 and connected, or otherwise coupled, to the first computer 108 within the first test station 102. During testing, the first computer 108 may transmit diagnostic signals to the wireless device 134, e.g., via a universal serial bus ("USB") connection or any other wired, or wireless, communication connection. The diagnostic signals may be used to test the wireless device 134, calibrate the wireless device 134, configure the wireless device 134, or any combination thereof.

During operation of the system 100, the processors 110, 116, 122 may execute program instructions stored in the memories 112, 118, 124 to perform one or more of the various method steps described herein. For example, in one aspect, the system 100 may perform one or more of the functions described herein when the processors 110, 116, 122 execute program instructions stored in the memories 112, 118, 124. In another aspect, the program instructions are stored on a computer-readable medium, such as a floppy disk, a compact disc ("CD"), a memory card, a flash memory wireless device, a ROM, or any other type of memory wireless device. The program instructions may be loaded into the memories 112, 118, 124 from the test server 126 via the network interface 128.

Figure 2:
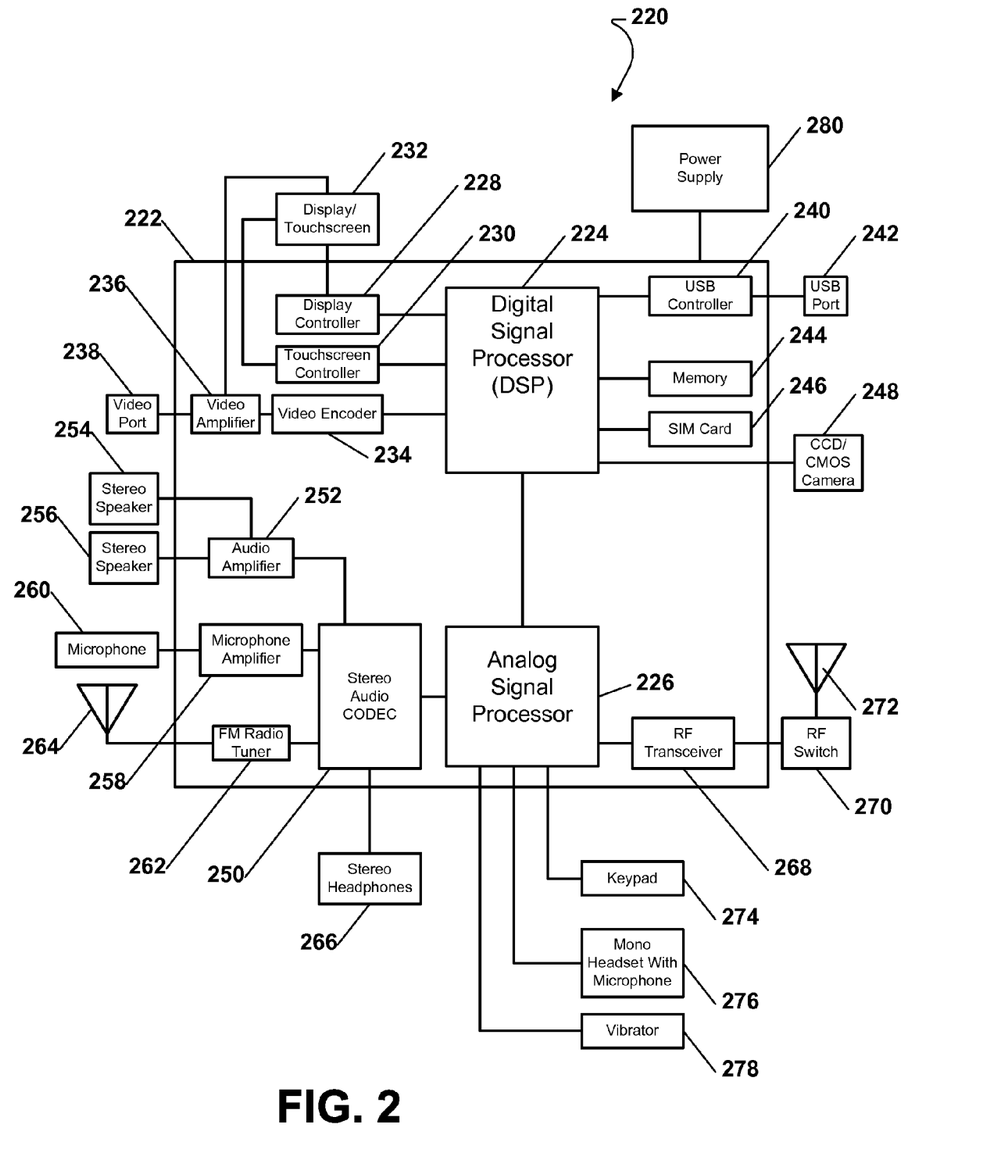
FIG. 2 is a diagram of a wireless device.

Referring to FIG. 2, an exemplary, non-limiting aspect of a wireless telephone is shown and is generally designated 220. The wireless telephone 220 may include an on-chip system 222 that may further include a digital signal processor 224 and an analog signal processor 226 that are coupled together. As depicted in FIG. 2, a display controller 228 and a touch-screen controller 230 may be coupled to the digital signal processor 224. In turn, a touchscreen display 232 external to the on-chip system 222 may be coupled to the display controller 228 and the touchscreen controller 230.

FIG. 2 also shows that a video encoder 234, e.g., a phase alternating line ("PAL") encoder, a sequential couleur a memoire ("SECAM") encoder, or a national television system(s) committee ("NTSC") encoder, is coupled to the digital signal processor 224. Moreover, a video amplifier 236 may be coupled to the video encoder 234 and the touchscreen display 232. Further, a video port 238 may be coupled to the video amplifier 236. As illustrated in FIG. 2, a universal serial bus ("USB") controller 240 may be coupled to the digital signal processor 224. Additionally, a USB port 242 may be coupled to the USB controller 240. A memory 244 and a subscriber identity module ("SIM") card 246 may be coupled to the digital signal processor 224. In a particular aspect, the memory 244 may include a factory test mode ("FTM") memory item, e.g., NV_FTM_MODE. Also, the memory 244 may include a boot count, e.g., NV_FTM_MODE_BOOT_COUNT. Further, as shown in FIG. 2, a digital camera 248 may be coupled to the digital signal processor 224. In an exemplary aspect, the digital camera 248 may be a charge-coupled wireless device ("CCD") camera or a complementary metal-oxide semiconductor ("CMOS") camera.

As illustrated in FIG. 2, a stereo audio CODEC 250 may be coupled to the analog signal processor 226. Moreover, an audio amplifier 252 may be coupled to the stereo audio CODEC 250. In an exemplary, non-limiting aspect, a first stereo speaker 254 and a second stereo speaker 256 may be coupled to the audio amplifier 252. FIG. 2 also shows that a microphone amplifier 258 may be also coupled to the stereo audio CODEC 250. Moreover, a microphone 260 may be coupled to the microphone amplifier 258. In a particular aspect, a frequency modulation ("FM") radio tuner 262 may be coupled to the stereo audio CODEC 250. Also, an FM antenna 264 may be coupled to the FM radio tuner 262. Also, stereo headphones 266 may be coupled to the stereo audio CODEC 250.

FIG. 2 also shows that a radio frequency ("RF") transceiver 268 may be coupled to the analog signal processor 226. An RF switch 270 may be coupled to the RF transceiver 268 and to an RF antenna 272. As depicted in FIG. 2, a keypad 274 may be coupled to the analog signal processor 226. Also, a mono headset with a microphone 276 may be coupled to the analog signal processor 226. Further, a vibrator wireless device (vibrator) 278 may be coupled to the analog signal processor 226. FIG. 2 also shows that a power supply 280 may be coupled to the on-chip system 222. In a particular aspect, the power supply 280 is a direct current ("DC") power supply that provides power to the various components of the wireless telephone 220 that require power. Further, in a particular aspect, the power supply is a rechargeable DC battery or a DC power supply that is derived from an alternating current ("AC") to DC transformer that is connected to an AC power source.

As illustrated in FIG. 2, the touchscreen display 232, the video port 238, the USB port 242, the camera 248, the first stereo speaker 254, the second stereo speaker 256, the microphone 260, the FM antenna 264, the stereo headphones 266, the RF switch 270, the RF antenna 272, the keypad 274, the mono headset with microphone 276, the vibrator 278, and the power supply 280 may be external to the on-chip system 222.

In one or more aspects, the processors 224, 226 may include logic to execute machine-readable instructions. In other words, the processors 224, 226 may act as a means for executing one or more computer programs that may include the method steps disclosed herein. The one or more computer programs may be stored in the memory 244 that is accessible to the processors 224, 226. In a particular aspect, the memory 244 may include may include random access memory ("RAM"), read only memory ("ROM"), flash memory, electrically erasable read only memory ("EEROM"), or any other suitable type of memory, or a combination thereof.

Figure 3:
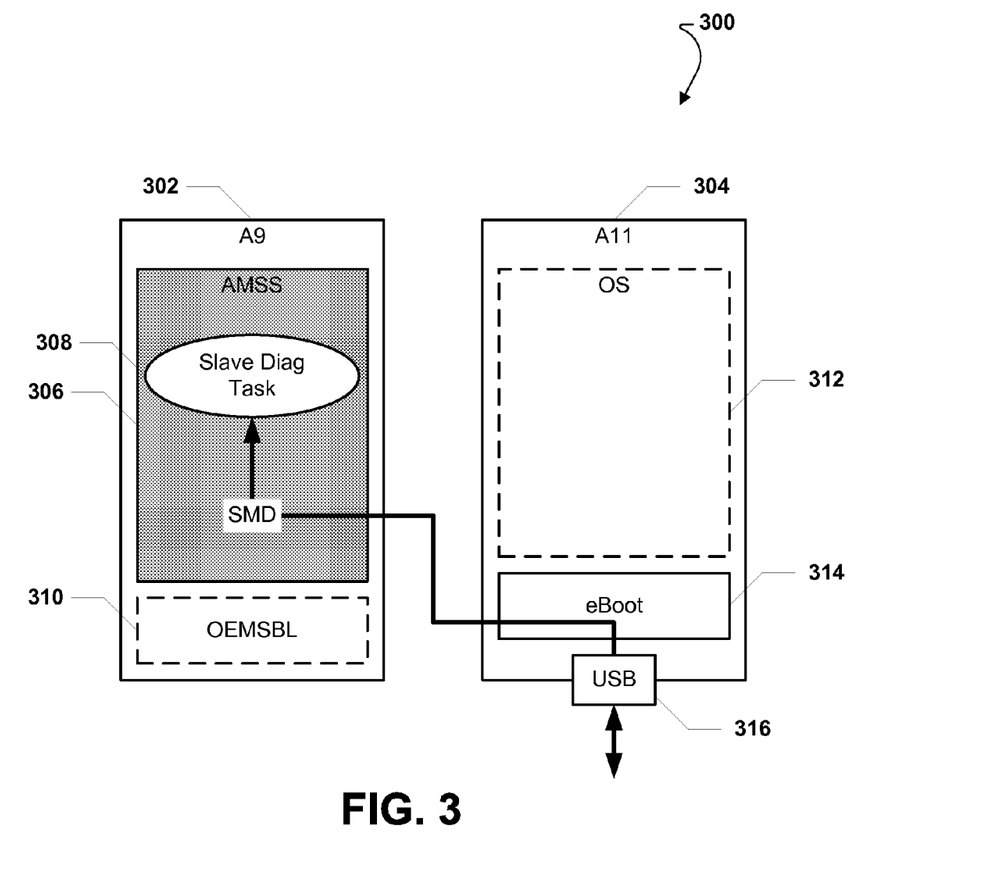
FIG. 3 is a diagram of a processor system associated with a wireless device.

Referring to FIG. 3 a processor system is shown and is generally designated 300. As shown, the processor system 300 may include a first processor 302 and a second processor 304. The first processor 302 may include system software 306, e.g., all mode system software ("AMSS") produced by Qualcomm, Incorporated of San Diego, Calif. The system software 306 may include a slave diagnostic ("Diag") task 308. Further, the first processor 302 may include an original equipment manufacturer secondary boot loader ("OEMSBL") 310.

As shown in FIG. 3, the second processor 304 may include an operating system ("OS") 312. The OS 312 may control the operation of a wireless device in which the processor system 300 is installed. The second processor 304 may also include a boot loader 314, e.g., eBoot. Further, the second processor 304 may include or be connected to a universal serial bus ("USB") port 316.

In a particular aspect, when the wireless device in which the processor system 300 is installed is booted, the second processor 304, e.g., the boot loader 314 therein, may read a non-volatile ("NV") item stored within a memory that is accessible to the boot loader 314 in order to determine if the wireless device is in a factory test mode ("FTM"). If the NV item is set to FTM, or the NV item is absent, the second processor 304 may stay in a boot loader mode and enumerate the USB port 316 as a diag serial port. Diagnostic packets may then be forwarded from the second processor 304 to the first processor 302 where the slave diag task 308 resides. If the NV item is not set to FTM, the boot loader 314 may continue to boot the OS 312.

Figure 4:
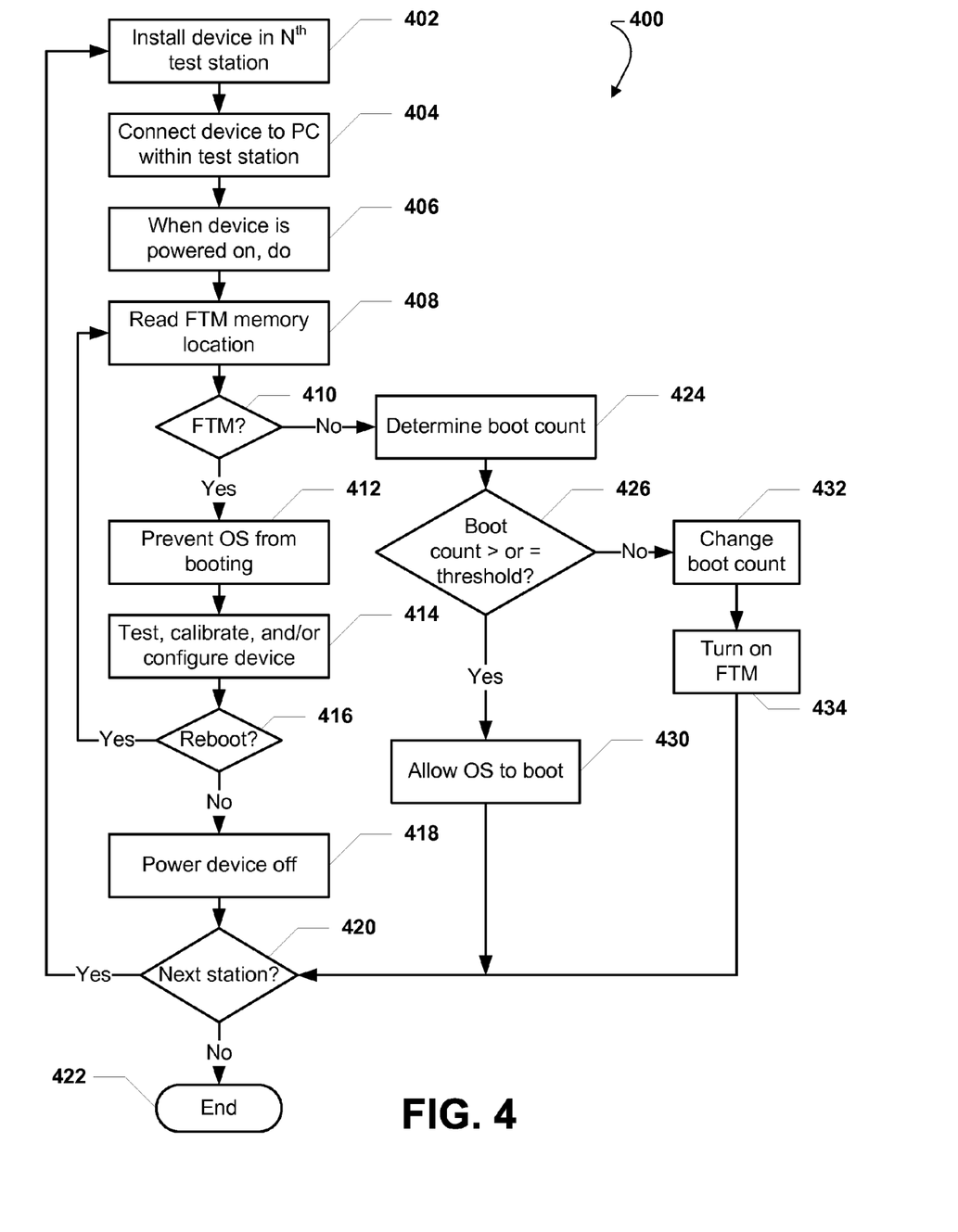
FIG. 4 is a flowchart illustrating method of testing a wireless device.

Referring to FIG. 4, a method of testing wireless devices is shown and is generally designated 400. Beginning at block 402, a wireless device may be installed in an Nth test station 402. In a particular aspect, the wireless device may be the wireless device 134 shown in FIG. 1, the wireless telephone 220 shown in FIG. 2, any other wireless device, or a combination thereof. At block 404, the wireless device may be connected to a personal computer ("PC") within the test station. Moving to block 406, a do loop may be entered wherein when the wireless device is powered on, one or more of the following steps may be performed. In a particular aspect, one or more of the method steps may be performed by a wireless device, an external computer wireless device connected to the wireless device, or by a combination thereof.

At block 408, the wireless device may read a FTM memory location. Then, at decision step 410, the wireless device may determine whether the wireless device is in FTM. The wireless device may determine whether the wireless device is in FTM by reading a FTM memory item and determining whether the FTM memory item is set to yes or no.

If the wireless device is in FTM, the method 400 may move to block 412 and the wireless device may prevent the OS within the wireless device from booting. Thereafter, at block 414, the wireless device may receive one or more test signals, calibration signals, configuration signals, software, or a combination thereof, from the PC. The test signals may be used to tune the wireless device, e.g., a radio frequency ("RF") antenna associated with the wireless device. These test signals may ensure that the RF antenna includes correct sensitivity levels and is tuned to the appropriate frequency bands. It may be appreciated that the wireless device may include numerous items therein that may need to be tested, calibrated, or otherwise configured.

From block 414, the method 400 may move to decision step 416 and the wireless device may determine whether it has been rebooted. If so, the method 400 may return to block 408 and continue as described herein. At decision step 416, if the wireless device is not rebooted, the method 400 may move to block 418 and the wireless device may be powered off. Moving to decision step 420, it may be determined whether the wireless device should be moved to a next test station for further testing, calibration, etc. If so, the method 400 may return to block 402 and continue as described herein. Otherwise, the method 400 may end at state 422.

Returning to decision step 410, if the wireless device is not in the FTM, the method 400 may proceed to block 424 and the wireless device may determine a boot count associated with the wireless device. Proceeding to decision step 426, the wireless device may determine whether the boot count is equal to a threshold value. If so, the method 400 may move to block 430, and the wireless device may allow the OS within the wireless device to boot. Thereafter, the method 400 may proceed to decision step 420 and continue as described herein.

Returning to decision step 426, if the boot count is not equal to the threshold value, the method 400 may move to block 432. At block 432, the wireless device may change, or otherwise alter, the boot count by one unit. For example, the wireless device may increment the boot count by one unit or decrement the boot count by one unit. Thereafter, at block 434, the wireless device may turn the FTM on, e.g., by setting the FTM memory item to yes. From block 434, the method 400 may proceed to decision step 420 and continue as described herein.

In a particular aspect, the method step of block 434 may be optional. For example, a wireless device manufacturer may set a boot count to twenty (20) but only test the phone in a manner that requires fifteen (15) boots. The manufacturer may store the wireless device, e.g., put the wireless device on a shelf, with the expectation that the wireless device may subsequently need an upgrade. However, the upgrade may not be necessary and the manufacturer may ship the wireless device directly without taking the wireless device from storage and resetting the boot count. The optional setting of the phone into FTM may be directed by a computer, e.g., a PC, connected to the wireless device.

Figure 5:
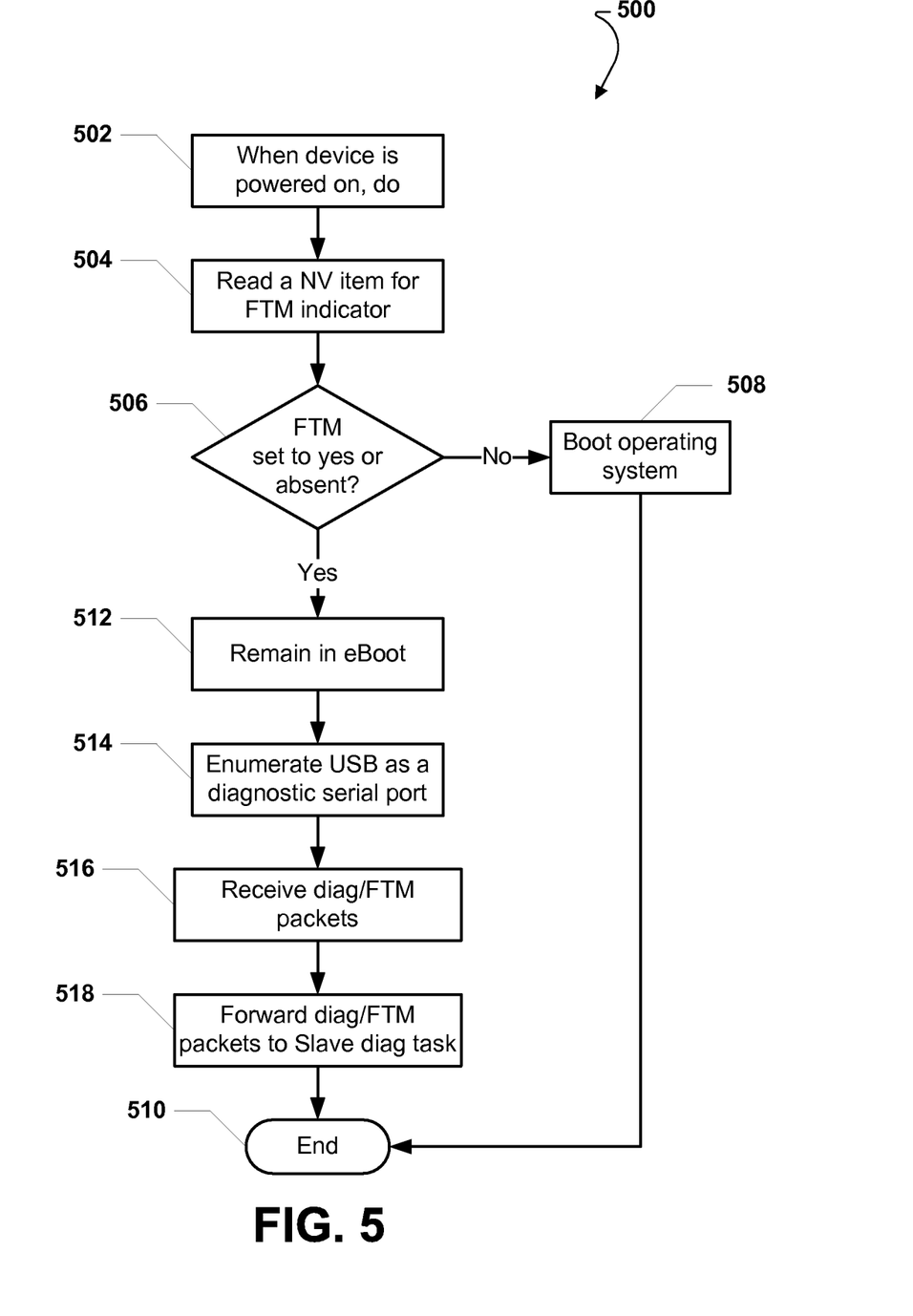
FIG. 5 is a flowchart illustrating a method of booting a wireless device.

FIG. 5 illustrates a method of booting a wireless device, generally designated 500. As shown, the method 500 begins at block 502 with a do loop wherein when the wireless device is powered on one or more of the following steps may be performed. In a particular aspect, one or more of the method steps may be performed by a wireless device, by an external computer wireless device connected to the wireless device, or by a combination thereof. At block 504, the wireless device, e.g., a processor within the wireless device, may read a NV memory item for an FTM indicator. At decision step 506, the wireless device may determine whether FTM indicator is set to yes or is absent, e.g., due to a flash erase. If the FTM indicator is not set to yes, e.g., set to no, the method 500 may proceed to block 508. At block 508, the wireless device may boot the operating system within the wireless device. Thereafter, the method 500 may end at state 510.

Returning to decision step 506, if the FTM indicator is set to yes or is absent, the method 500 may continue to block 512. At block 512, the wireless device may remain in a boot loader mode, e.g., eBoot. Then, at block 514, the wireless device may enumerate a USB port as a diagnostic serial port. It may be appreciated that the wireless device may enumerate any communication port wired, or unwired, as a diagnostic serial port. At block 516, the wireless device may receive one or more diag/FTM packets. Moving to block 518, the wireless device may forward the diag/FTM packets to a slave diag task within the wireless device, e.g., within another processor within the wireless device. Then, the method 500 may end at state 510.

Figure 6:
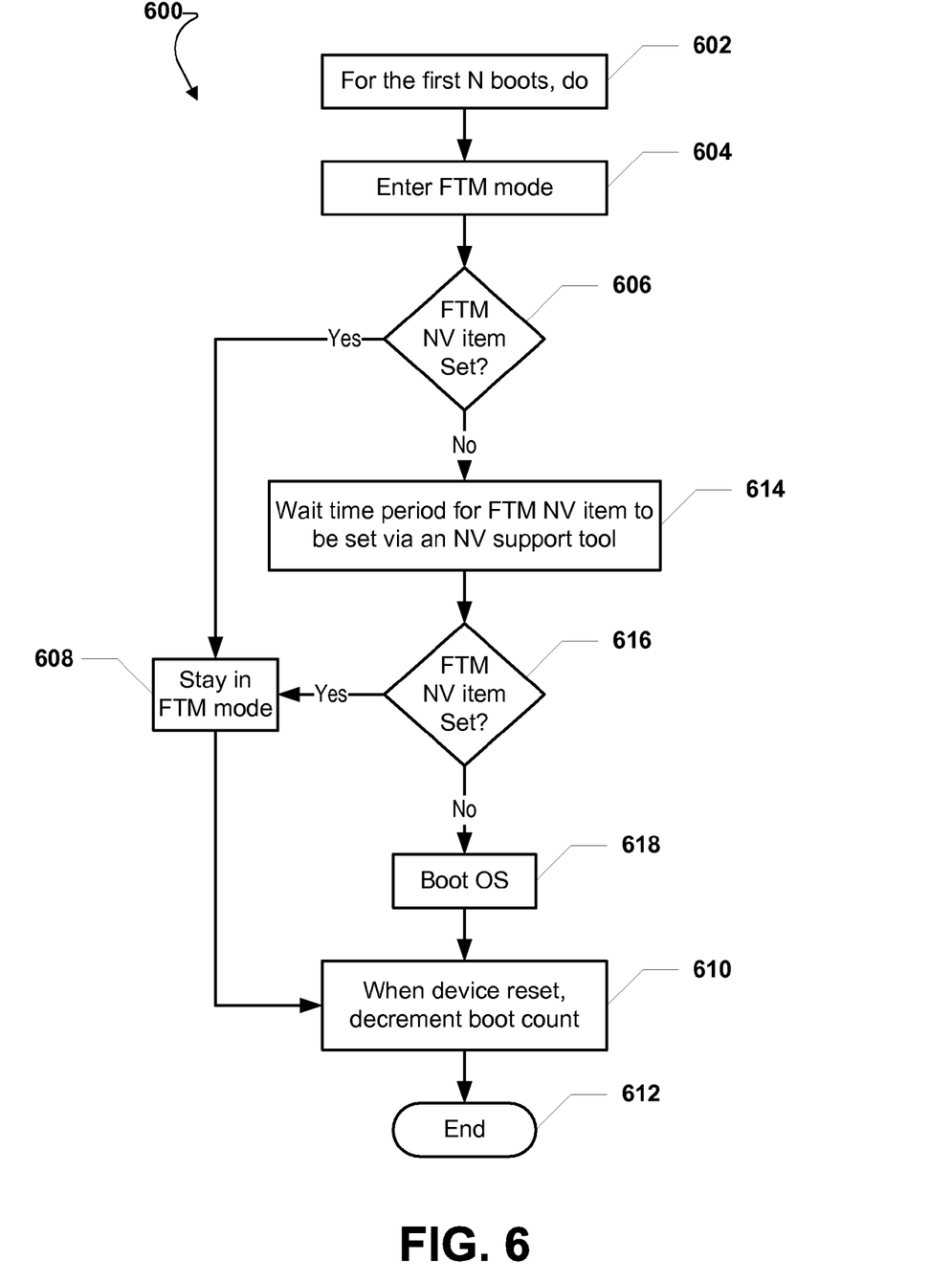
FIG. 6 is a flowchart illustrating a method of monitoring a boot count associated with a wireless device.

Referring now to FIG. 6, a method of monitoring a boot count associated with a wireless device is shown and is generally designated 600. In a particular aspect, the method steps may be performed by a wireless device, by an external computer wireless device connected to the wireless device, or by a combination thereof. As shown, the method 600 may commence with a do loop wherein for the first N boots, one or more of the following steps may be performed. At block 604, the wireless device may enter the FTM. Thereafter, at decision step 606, the wireless device, e.g., a processor therein, may determine whether a FTM NV item is set to on. If so, the method 600 may move to block 608 and the wireless device may remain in the FTM. Then, the method 600 may move to block 610 and when the wireless device is reset, the boot count may be decremented. The method 600 may then end at state 612.

Returning to decision step 606, if the FTM NV item is not set to on, the method 600 may proceed to block 614 and the wireless device may wait a time period, e.g., one second, two seconds, three seconds, four seconds, five seconds, etc., for the FTM NV item to be set via a NV support tool, e.g., a Qualcomm Product Support Tool ("QPST") NV tool. In another aspect, the FTM NV item may be set by some another external support tool. Next, at decision step 616, the wireless device may determine if the FTM NV item has been set by the NV support tool. If so, the method 600 may proceed to block 608 and continue as described herein. If the FTM NV item is not set by the NV support tool, the method 600 may move to block 618 and the wireless device may boot the operating system within the wireless device. Thereafter, the method 600 may move to block 610 and continue as described herein.

It may be appreciated that a computer program may comprise the method steps described above. Further, the computer program may be executed within a wireless device to control booting of the operating system within the wireless device. During testing, e.g., when the wireless device is in the FTM, the operating system may be prevented from booting. In such a case, wherein the wireless device is tested, reset (or rebooted), repeatedly, preventing the operation system from booting on each reset (or reboot), may result in a substantial savings in time during the manufacturing and testing process. Moreover, a boot count may be set to a particular value, e.g., ten (10). The boot count may be decremented each time the wireless device is powered on and as long as the boot count is not zero, the wireless device may automatically prevent the OS from booting. However, when the boot count reaches zero (0), the wireless device may allow the OS to boot. Additionally, the boot count may be resent to a new value and the wireless device may continue to prevent the OS from booting until the boot count reaches zero.

It may be appreciated that during servicing, after the wireless device has been sold to a user, the wireless device may be placed in FTM at a service center in order to test the wireless device. As described herein the wireless device may be placed in FTM using a QPST NV tool.

It is to be understood that the method steps described herein do not necessarily have to be performed in the order as described. Further, words such as "thereafter", "then", "next", etc. are not intended to limit the order of the steps. These words are simply used to guide the reader through the description of the method steps.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage wireless devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of booting a wireless device, the method comprising:
   reading a factory test mode memory item when the wireless device is powered on;
   determining whether the factory test mode memory item is set to a first state;
   preventing an operating system of the wireless device from booting when the factory test mode memory item is set to the first state;
   determining whether a boot count reaches a threshold when the factory test mode memory item is set to a second state, wherein the boot count is altered by one unit each time the wireless device is powered on;
   preventing the operating system of the wireless device from booting when the boot count has not reached the threshold;

altering the boot count when the boot count has not reached the threshold; and setting the factory test mode memory item to the first state.

2. The method of claim 1, further comprising:

remaining in a boot loader mode when the factory test mode memory item is set to the first state.

3. The method of claim 2, further comprising:

enumerating a port as a diagnostic serial port when the factory test mode memory item is set to the first state; and receiving one or more diagnostic packets when the factory test mode memory item is set to the first state.

4. The method of claim 1, further comprising:

allowing the operating system of the wireless device to boot when the factory test mode memory item is set to a second state and the boot count has reached the threshold.

5. A wireless device, comprising:

a memory; and a processor connected to the memory, wherein the processor is configured with processor-executable instructions to perform operations comprising:

reading a factory test mode memory item when the wireless device is powered on;

determining whether the factory test mode memory item is set to a first state;

preventing an operating system of the wireless device from booting when the factory test mode memory item is set to the first state;

determining whether a boot count reaches a threshold when the factory test mode memory item is set to a second state, wherein the boot count is altered by one unit each time the wireless device is powered on;

preventing the operating system of the wireless device from booting when the boot count has not reached the threshold;

altering the boot count when the boot count has not reached the threshold; and setting the factory test mode memory item to the first state.

6. The wireless device of claim 5, wherein the processor is configured with processor-executable instructions to perform operations further comprising:

remaining in a boot loader mode when the factory test mode memory item is set to the first state.

7. The wireless device of claim 6, wherein the processor is configured with processor-executable instructions to perform operations further comprising:

enumerating a port as a diagnostic serial port when the factory test mode memory item is set to the first state; and receiving one or more diagnostic packets when the factory test mode memory item is set to the first state.

8. The wireless device of claim 5, wherein the processor is configured with processor-executable instructions to perform operations further comprising:

allowing the operating system of the wireless device to boot when the factory test mode memory item is set to a second state and the boot count has reached the threshold.

9. A wireless device comprising:

means for reading a factory test mode memory item when the wireless device is powered on;

means for determining whether the factory test mode memory item is set to a first state;

means for preventing an operating system of the wireless device from booting when the factory test mode memory item is set to the first state;

means for determining whether a boot count reaches a threshold when the factory test mode memory item is set to a second state, wherein the boot count is altered by one unit each time the wireless device is powered on;

means for preventing the operating system of the wireless device from booting when the boot count has not reached the threshold;

means for altering the boot count when the boot count has not reached the threshold; and means for setting the factory test mode memory item to the first state.

10. The wireless device of claim 9, further comprising:

means for remaining in a boot loader mode when the factory test mode memory item is set to the first state.

11. The wireless device of claim 10, further comprising:

means for enumerating a port as a diagnostic serial port when the factory test mode memory item is set to the first state; and means for receiving one or more diagnostic packets when the factory test mode memory item is set to the first state.

12. The wireless device of claim 9, further comprising:

means for allowing the operating system of the wireless device to boot when the factory test mode memory item is set to a second state and the boot count has reached the threshold.

13. A non-transitory computer-readable medium having stored thereon processor-executable instructions configured to cause a processor to perform operations comprising:

reading a factory test mode memory item when a wireless device is powered on;

determining whether the factory test mode memory item is set to a first state;

preventing an operating system of the wireless device from booting when the factory test mode memory item is set to the first state;

determining whether a boot count reaches a threshold when the factory test mode memory item is set to a second state, wherein the boot count is altered by one unit each time the wireless device is powered on;

preventing the operating system of the wireless device from booting when the boot count has not reached the threshold;

altering the boot count when the boot count has not reached the threshold; and setting the factory test mode memory item to the first state.

14. The non-transitory computer-readable medium of claim 13, wherein the stored processor-executable instructions are configured to cause the processor to perform operations further comprising:

remaining in a boot loader mode when the factory test mode memory item is set to the first state.

15. The non-transitory computer-readable medium of claim 14, wherein the stored processor-executable instructions are configured to cause the processor to perform operations further comprising:

enumerating a port as a diagnostic serial port when the factory test mode memory item is set to the first state; and receiving one or more diagnostic packets when the factory test mode memory item is set to the first state.

16. The non-transitory computer-readable medium of claim 14, wherein the stored processor-executable instructions are configured to cause the processor to perform operations further comprising:
   allowing the operating system of the wireless device to boot when the factory test mode memory item is set to a second state and the boot count has reached the threshold.

\* \* \* \* \*